(12) United States Patent
Gong et al.

(10) Patent No.: US 12,140,373 B2
(45) Date of Patent: *Nov. 12, 2024

(54) OVERCOOLED MEAT FRESH-PRESERVATION CONTROL METHOD, CONTROLLER, AND REFRIGERATOR

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Qinqin Gong, Anhui (CN); Huixin Shi, Anhui (CN); Zhigang Wu, Anhui (CN); Zhifang Ning, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

(*) Notice: Subject to any disclaimer, the term of this patent is extended or adjusted under 35 U.S.C. 154(b) by 1033 days.

This patent is subject to a terminal disclaimer.

(21) Appl. No.: 16/611,809

(22) PCT Filed: Jun. 30, 2017

(86) PCT No.: PCT/CN2017/091135
§ 371 (c)(1),
(2) Date: Feb. 11, 2021

(87) PCT Pub. No.: WO2018/205385
PCT Pub. Date: Nov. 15, 2018

(65) Prior Publication Data
US 2021/0164727 A1    Jun. 3, 2021

(30) Foreign Application Priority Data
May 9, 2017 (CN) .......................... 201710323115.8

(51) Int. Cl.
F25D 29/00     (2006.01)
A23B 4/06      (2006.01)
(Continued)

(52) U.S. Cl.
CPC ............ F25D 29/005 (2013.01); A23B 4/066 (2013.01); A23B 4/07 (2013.01); A23L 3/001 (2013.01);
(Continued)

(58) Field of Classification Search
CPC .... F25D 29/005; F25D 29/00; F25D 2500/06; F25D 2700/16; A23B 4/066; A23B 4/07;
(Continued)

(56) References Cited

U.S. PATENT DOCUMENTS 7,686,232 B2 *   3/2010  Brock ................... G01K 13/00
                                                       236/94
8,061,150 B2 *  11/2011  Kim ........................ F25C 1/18
                                                       62/449
(Continued)

FOREIGN PATENT DOCUMENTS

CN     101358798 A     2/2009
CN     102706069 A    10/2012
(Continued)

OTHER PUBLICATIONS

Cia Qing-Wen et al., "A Review of Super-Chilling Technology", Ood & Machinery, vol. 29, No. 6, Nov. 2013, 5 pages.
(Continued)

*Primary Examiner* — Ramesh B Patel
(74) *Attorney, Agent, or Firm* — Seed IP Law Group LLP

(57) ABSTRACT

An overcooled meat fresh-preservation control method, a controller and a refrigerator are provided. The control method comprises: S1 (101), acquiring a current tempera-
(Continued)

ture of meat food in a compartment of a refrigerator in real time; S2 (102), judging whether the current temperature of the meat food is greater than or equal to a first temperature threshold t0, and if yes, performing step S3 (103); S3 (103), controlling the compartment to perform a cooling operation; S4 (104), judging whether the meat food has been cooled down to a phase transformation point temperature t1 during the cooling operation, and if yes, performing step S5 (105), the phase transformation point temperature t1 being the temperature of a critical point at which the phase transformation of the meat food occurs; S5 (105), starting timing once the temperature has been cooled down to the phase transformation point temperature t1, and performing step S6 (106) after the timing reaches a first preset time period; and S6 (106), controlling the compartment to perform a low-temperature stable operation according to a third target temperature $T_3$, the third target temperature $T_3$ being a freezing point temperature of the meat food. The overcooled meat fresh-preservation control method provided by the present disclosure may prolong the fresh-preservation period as much as possible while ensuring that the meat food is not frozen.

12 Claims, 10 Drawing Sheets

(51) Int. Cl.
*A23B 4/07* (2006.01)
*A23L 3/00* (2006.01)
*A23L 3/36* (2006.01)
*A23L 3/365* (2006.01)
*G05B 15/02* (2006.01)

(52) U.S. Cl.
CPC .............. *A23L 3/363* (2013.01); *A23L 3/365* (2013.01); *F25D 29/00* (2013.01); *G05B 15/02* (2013.01); *A23V 2002/00* (2013.01); *F25D 2500/06* (2013.01); *F25D 2700/16* (2013.01)

(58) Field of Classification Search
CPC . A23B 4/06; A23L 3/001; A23L 3/363; A23L 3/365; G05B 15/02; A23V 2002/00
See application file for complete search history.

(56) References Cited

U.S. PATENT DOCUMENTS

| | | | | |
|---|---|---|---|---|
| 8,397,521 | B2* | 3/2013 | Kim | A23L 3/365 62/66 |
| 8,677,770 | B2* | 3/2014 | Kim | A23L 3/36 62/75 |
| 10,772,454 | B2* | 9/2020 | Mendonça Vilela Pinto Ferreira | A47J 36/321 |
| 11,291,327 | B2* | 4/2022 | Koennings | A47J 36/321 |
| 2007/0062206 | A1* | 3/2007 | Brock | G01K 1/08 236/94 |
| 2010/0083687 | A1* | 4/2010 | Handa | A23L 3/362 700/282 |
| 2010/0109884 | A1* | 5/2010 | Brock | B60H 1/00978 340/584 |
| 2015/0323237 | A1* | 11/2015 | Kim | F25C 1/00 62/340 |
| 2019/0254298 | A1* | 8/2019 | Carballo | F24F 6/043 |
| 2021/0156610 | A1 | 5/2021 | Gong et al. | |
| 2021/0164727 | A1 | 6/2021 | Gong et al. | |

FOREIGN PATENT DOCUMENTS

| | | |
|---|---|---|
| CN | 103175375 A | 6/2013 |
| CN | 203163416 U | 8/2013 |
| CN | 104729190 A | 6/2015 |
| CN | 106461304 A | 2/2017 |
| CN | 104833169 B | 5/2020 |
| JP | 4-43276 A | 2/1992 |
| JP | 2001-4260 A | 1/2001 |
| JP | 2001001260 A | 1/2001 |
| JP | 2006-234365 A | 9/2006 |
| JP | 2007-113818 A | 5/2007 |
| JP | 2007/271152 A | 10/2007 |
| JP | 2009-30934 A | 2/2009 |
| JP | 2009030934 A | 2/2009 |
| JP | 2010-261677 A | 11/2010 |
| JP | 4948562 B2 | 6/2012 |
| KR | 10-2009-0028362 A | 3/2009 |
| WO | 2009035194 A2 | 3/2009 |

OTHER PUBLICATIONS

Kaale et al., "Superchilling of Food: A Review", Journal of Food Engineering, 107 (2011) pp. 141-146.

Sun et al., "Influences of Superchilling Preservation Technology on Beef", Food and Fermentation Technology, vol. 51, No. 6, 5 pages.

\* cited by examiner

OVERCOOLED MEAT FRESH-PRESERVATION CONTROL METHOD, CONTROLLER, AND REFRIGERATOR

CROSS-REFERENCE TO RELATED APPLICATION

The present application claims priority to Chinese patent application No. 2017103231158 filed on May 9, 2017, entitled "Overcooled Meat Fresh-preservation Control Method, Controller and Refrigerator", which is incorporated herein by reference in its entirety.

BACKGROUND

Technical Field

This disclosure relates to the field of intelligent control, in particular to an overcooled meat fresh-preservation control method, a controller and a refrigerator.

Description of the Related Art

With the popularity of refrigerators, people are getting more and more used to keeping food fresh and storing it using the refrigerators in order to prolong the fresh-preservation and storage period of food, especially for meat food.

Currently, the fresh-preservation control methods for meat mainly include the following:

(1) directly placing meat into a freezing compartment, freezing at −18° C. for storing in which the meat generally can be stored for several months, but one of the most serious problems is that it is inconvenient to be thawed, and the quality and taste of the thawed meat are significantly reduced;

(2) storing by soft freezing in which the temperature of the compartment is generally between −5° C. to −9° C. at this time, and there is a problem that the meat is still frozen and it is difficult to be thawed although the meat also can be stored for a long period under this condition; and (3) a zero-degree fresh-preservation technology being available in the market in which the temperature is controlled at about 1° C. and which has the problems that the fresh-preservation period is too short to ensure freshness for one-week although the problem of meat freezing can be avoided.

Therefore, the existing fresh-preservation control methods for meat are not able to meet the actual needs of users.

BRIEF SUMMARY

In view of the defects in the prior art, the present disclosure provides an overcooled meat fresh-preservation control method, a controller and a refrigerator. The over-cooled meat fresh-preservation control method, the controller and the refrigerator provided by the present disclosure can prolong the fresh-preservation period as much as possible while ensuring that the meat food is not frozen.

In order to solve the technical problems above, the present disclosure provides the following technical solutions:

according to a first aspect, the present disclosure provides an overcooled meat fresh-preservation control method comprising:

S1, acquiring a current temperature of meat food in a compartment of a refrigerator in real time;

S2, judging whether the current temperature of the meat food is greater than or equal to a first temperature threshold $t_0$, and if yes, performing step S3;

S3, controlling the compartment to perform a cooling operation;

S4, judging whether the meat food has been cooled down to a phase transformation point temperature $t_1$ during the cooling operation, and if yes, performing step S5, wherein the phase transformation point temperature $t_1$ is the temperature of a critical point at which the phase transformation of the meat food occurs;

S5, starting timing once the temperature has been cooled down to the phase transformation point temperature $t_1$, and performing step S6 after the timing reaches a first preset time period;

S6, controlling the compartment to perform a low-temperature stable operation according to a third target temperature $T_3$, wherein the third target temperature $T_3$ is a freezing point temperature of the meat food.

Further, if it is judged that the current temperature of the meat food is less than the first temperature threshold $t_0$ in the step S2, then S7 is performed;

S7, controlling the compartment to perform a heating operation;

wherein, after the performance of the S7 is complete, the performance of the S1 is continued.

Further, the S4 is further used to judge whether the meat food is frozen during the cooling operation; correspondingly, if it is judged that the meat food is frozen during the cooling operation in the step S4, then the step S7 is performed;

S7, controlling the compartment to perform a heating operation;

wherein, after the performance of the S7 is complete, the performance of the S1 is continued.

Further, the judging whether the meat food is frozen during the cooling operation in the step S4 includes:

judging whether the meat food has a lowest temperature point during the cooling operation, and judging that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judging whether a case that the temperature of the meat food remains unchanged during a preset continuous time period occurs during the cooling operation, and if yes, judging that the meat food is frozen during the cooling operation, wherein the length of the preset continuous time period is greater than or equal to a second time length threshold.

Further, the step S3 specifically includes:

controlling the compartment to perform a cooling operation according to an initial target temperature $T_0$, and the initial target temperature $T_0$ ranging from −10° C. to −1° C.

Further, the step S3 specifically includes:

controlling the compartment to perform a cooling operation according to a first target temperature $T_1$, and continuously controlling the compartment to perform a cooling operation according to a second target temperature $T_2$ after the current temperature of the meat food has been cooled down to $t_0$, $T_1 < T_2$.

Further, the step S3 specifically includes:

controlling a damper of the compartment to be fully opened and performing a cooling operation according to the initial target temperature $T_0$, and controlling the damper of the compartment to be half-opened and continuously performing the cooling operation according to the initial target temperature $T_0$ after the current temperature of the meat food has been cooled down to $t_0$.

Further, the step S7 specifically includes:

controlling the compartment to perform a heating operation according to a fourth target temperature $T_4$, and the fourth target temperature $T_4$ ranging from $-1°$ C. to $6°$ C.

Further, the step S1 specifically includes:

acquiring the current temperature of the meat food in the compartment of the refrigerator using a plurality of temperature sensors;

correspondingly, the judging whether the meat food is frozen during the cooling operation in the step S4 specifically includes:

simultaneously judging whether the meat food is frozen during the cooling operation using the plurality of temperature sensors and taking the judgment result of the temperature sensor judging that the meat food has been frozen during the cooling operation at the first time as the criterion.

Further, the first temperature threshold $t_0$ ranges from $-2°$ C. to $4°$ C.

Further, the compartment is one or more of the following:

a variable temperature chamber of a refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Further, the method further includes:

sending a reminder information to a user if it is judged that the storage time of the meat food in the compartment of the refrigerator exceeds the preset number of days.

According to a second aspect, the present disclosure also provides a controller, including:

a temperature acquisition module configured to acquire a current temperature of meat food in a compartment of a refrigerator in real time;

a first judgment module configured to judge whether the current temperature of the meat food is greater than or equal to a first temperature threshold $t_0$;

a first control module configured to control the compartment to perform a cooling operation when the first judgment module judges that the current temperature of the meat food is greater than or equal to the first temperature threshold $t_0$;

a second judgment module configured to judge whether the meat food has been cooled down to a phase transformation point temperature $t_1$ during the cooling operation, wherein the phase transformation point temperature $t_1$ is the temperature of a critical point at which the phase transformation of the meat food occurs;

a timing module configured to start timing once the temperature has been cooled down to the phase transformation point temperature $t_1$; and a second control module configured to control the compartment to perform a low-temperature stable operation according to a third target temperature $T_3$ after the timing by the timing module reaches a first preset time period, wherein the third target temperature $T_3$ is a freezing point temperature of the meat food.

Further, the controller further includes:

a third control module configured to control the compartment to perform a heating operation when the first judgment module judges that the current temperature of the meat food is less than the first temperature threshold $t_0$.

Further, the second judgment module is further configured to judge whether the meat food is frozen during the cooling operation.

Correspondingly, the controller further includes:

a third control module configured to control the compartment to perform a heating operation when the second judgment module judges that that the meat is frozen during the cooling operation.

Further, when the second judgment module judges whether the meat food is frozen during the cooling operation, it is specifically configured to:

judge whether the meat food has a lowest temperature point during the cooling operation, and judge that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judge whether a case that the temperature of the meat food remains unchanged during a preset continuous time period occurs during the cooling operation, and if yes, judge that the meat food is frozen during the cooling operation, wherein the length of the preset continuous time period is greater than or equal to a second time length threshold.

Further, when the first control module controls the compartment to perform the cooling operation, it is specifically configured to:

control the compartment to perform the cooling operation according to an initial target temperature $T_0$, and the initial target temperature $T_0$ ranging from $-10°$ C. to $-1°$ C.

Further, when the first control module controls the compartment to perform the cooling operation, it is specifically configured to:

control the compartment to perform the cooling operation according to a first target temperature $T_1$, and continuously control the compartment to perform the cooling operation according to a second target temperature $T_2$ after the current temperature of the meat food has been cooled down to $t_0$, $T_1<T_2$.

Further, when the first control module controls the compartment to perform the cooling operation, it is specifically configured to:

control a damper of the compartment to be fully opened and performing the cooling operation according to the initial target temperature $T_0$, and control the damper of the compartment to be half-opened and continuously perform the cooling operation according to the initial target temperature $T_0$ after the current temperature of the meat food has been cooled down to $t_0$.

Further, when the third control module controls the compartment to perform the heating operation, it is specifically configured to:
control the compartment to perform the heating operation according to a fourth target temperature $T_4$, and the fourth target temperature $T_4$ ranging from $-1°$ C. to $6°$ C.

Further, the temperature acquisition module is specifically configured to acquire the current temperature of the meat food in the compartment of the refrigerator using a plurality of temperature sensors;
correspondingly, when the second judgment module judges whether the meat food is frozen during the cooling operation, it is specifically configured to:
simultaneously judge whether the meat food is frozen during the cooling operation using the plurality of temperature sensors and take the judgment result of the temperature sensor judging that the meat food has been frozen during the cooling operation at the first time as the criterion.

Further, the first temperature threshold $t_0$ ranges from $-2°$ C. to $4°$ C.

Further, the compartment is one or more of the following:
a variable temperature chamber of a refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Further, the controller further includes:
a reminding module configured to send a reminder information to a user if it is judged that the storage time of the meat food in the compartment of the refrigerator exceeds the preset number of days.

According to a third aspect, the present disclosure provides a refrigerator comprising the controller of any of the embodiments above.

According to the technical solutions above, the overcooled meat fresh-preservation control method provided by the present disclosure detects the temperature of the meat food placed in the compartment in real time, controls the compartment to perform a low-temperature operation to cool the meat food if the temperature of the meat food is greater than or equal to the first temperature threshold $t_0$ (for example, the meat food is normal temperature meat), meanwhile starts timing if the temperature of the meat food has been cooled down to the phase transformation point temperature $t_1$ during the process of cooling the meat food, and controls the compartment to perform a stable operation at a low-temperature critical freezing state with the freezing point temperature of the meat food as the target temperature after timing reaches a preset time length, so as to ensure that the meat food is at a relatively low temperature environment for a long time while ensuring that meat food is not frozen. It can be seen that the control method of the present disclosure mainly controls the meat food to be in an overcooled state for a long time and then maintains it near the freezing point, so as to ensure that the food is in a relatively low temperature environment for a long time and that the meat food is kept fresh in an overcooled state in the refrigerator without being frozen, thereby prolonging the fresh-preservation period. That is, the present disclosure utilizes the characteristics of the overcooled and stable section of the meat food, fully exerts the overcooled advantage, and makes the meat in an overcooled state for a long time without being frozen, thereby prolonging the fresh-preservation period of the meat food. By adopting the control method of the present disclosure, the shelf life of the meat can be prolonged to more than 7 days, and the non-freezing and fresh-preservation effects can be achieved.

BRIEF DESCRIPTION OF THE DRAWINGS

In order to more clearly illustrate the technical solutions disclosed in the embodiments of the present disclosure or the prior art, the drawings used in the descriptions of the embodiments or the prior art will be briefly described below. Obviously, the drawings in the following description are only certain embodiments of the present disclosure, and other drawings can be obtained according to these drawings without any creative work for those skilled in the art.

DETAILED DESCRIPTION

In order to make the object, technical solutions and advantages of the embodiments of the present disclosure more clear, the technical solutions in the embodiments of the present disclosure are clearly and completely described in the following in conjunction with the accompanying drawings in the embodiments of the present disclosure. Obviously, the described embodiments are part of the embodiments of the present disclosure, and not all of the embodiments. All other embodiments obtained by a person of ordinary skill in the art based on the embodiments of the present disclosure without any creative work belong to the scope of the present disclosure.

Figure 1:
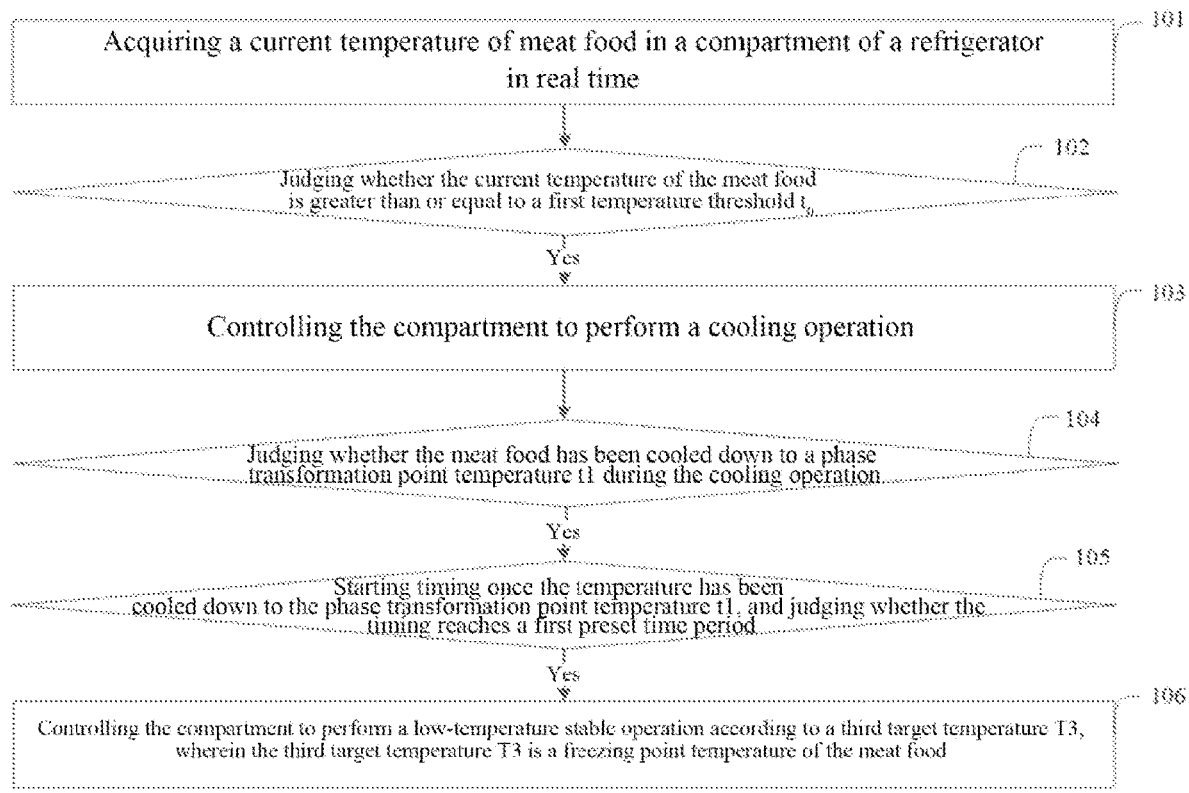
FIG. 1 is a flow chart of an overcooled meat fresh-preservation control method according to an embodiment of the present disclosure.

An embodiment of the present disclosure provides a flow chart of an overcooled meat fresh-preservation control method. Referring to FIG. 1, the method includes the following steps.

Step 101: a current temperature of meat food in a compartment of a refrigerator is acquired in real time.

In this step, the compartment may be a variable temperature chamber of a refrigerator, a variable temperature drawer in a refrigerating compartment of the refrigerator or a variable temperature drawer in a freezing compartment of the refrigerator. Of course, in order to make more reasonable use of the refrigerator space, the variable temperature chamber of the refrigerator, the variable temperature drawer in the refrigerating compartment of the refrigerator, or the variable temperature drawer in the freezing compartment of the refrigerator may be isolated into a plurality of variable temperature regions, so that each variable temperature region isolated can also be regarded as a compartment. That is, the compartment in this embodiment may be understood as multiple spaces as long as the temperature environment in the compartment is adjustable (for example, a temperature environment of −10 to 8° C. can be achieved).

It can be understood that when the variable temperature chamber of the refrigerator, the variable temperature drawer in the refrigerating compartment of the refrigerator, or the variable temperature drawer in the freezing compartment of the refrigerator are isolated into a plurality of variable temperature regions, an air supply and return structure can be separately provided for each region (multiple individual dampers or many-driven-by-one damper design can be used), or a size-fine-tunable baffle structure that can slide towards the left or right can also be flexibly designed so that users can adjust the size of each region; in addition, the temperature detection and cooling control of each region can be performed completely independently.

In this step, the meat food in the compartment of the refrigerator may be meat such as chicken, pork, duck, beef, fish, and the like;

Step 102: whether the current temperature of the meat food is greater than or equal to a first temperature threshold $t_0$ is judged, and if yes, step 103 is then performed.

In this step, the first temperature threshold $t_0$ may range from −2° C. to 4° C.

Step 103: the compartment is controlled to perform a cooling operation.

In this step, the compartment is controlled to perform a cooling operation to cool the meat food so as to achieve the fresh-preservation storage of meat if it is judged that the current temperature of the meat food is greater than or equal to a first temperature threshold $t_0$ (for example, the meat is normal temperature meat).

It can be understood that the temperature of the compartment can be set as needed, for example, set to −6° C., that is, the compartment is controlled to perform the cooling operation with −6° C. as the target temperature when the compartment is controlled to perform the cooling operation. Of course, in order to ensure that a phase transformation of the meat food can occur during the cooling operation, the target temperature set herein during the cooling operation of the compartment cannot be excessively high, and should be at least a temperature below zero, preferably −10° C. to −1° C.

Step 104: whether the meat food has been cooled down to a phase transformation point temperature $t_1$ during the cooling operation is judged, and if yes, step S5 is performed, wherein the phase transformation point temperature $t^1$ is a temperature of a critical point at which the phase transformation of the meat food occurs.

In this step, the phase transformation point temperature $t_1$ is the temperature of a critical point at which the phase transformation of the meat food occurs. The critical point at which the phase transformation of the meat food occurs is the critical point at which the water in the meat food just begins to crystallize. The phase transformation point temperature of general meat foods ranges from −3 to 0° C. It should be understood that the meat food does not be frozen when it begins to undergo a phase transformation, and it takes a time period from the occurrence of the phase transformation to the freezing. Different meat foods take different time lengths, for example, pork, beef, chicken, and fish may have different time lengths.

Step 105: timing is started once the temperature has been cooled down to the phase transformation point temperature $t_1$, and whether the timing reaches a first preset time period is judged, and if yes, step S106 is then performed.

In this step, timing is started if it is detected that the meat food has been cooled down to the phase transformation point temperature $t_1$ during the cooling operation, and the timing is performed for the first preset time period so as to control the meat food to be in an overcooled state for a long time. Here, the range of the first preset time period needs to be determined according to the overcooled time of the actual meat food under the temperature condition and is generally between 2 and 100 hours.

Step 106: the compartment is controlled to perform a low-temperature stable operation according to a third target temperature $T_3$, wherein the third target temperature $T_3$ is a freezing point temperature of the meat food.

In this step, the freezing point temperature of the meat food generally ranges from −5 to 0° C.

According to the description of the step 105 above, the timing is started if it is detected that the meat food has be cooled down to the phase transformation point temperature $t_1$ during the cooling operation, and the compartment is controlled to perform a low-temperature stable operation with the freezing point temperature of the meat food as the target temperature after the timing reaches the first preset time period so as to ensure that the meat food is maintained near the freezing point to maintain a critically frozen low-temperature stable state.

Therefore, in the present embodiment, the current temperature of the meat food placed in the compartment is detected in real time, the temperature is controlled to be cooled if it is the normal temperature meat, and it is elevated into the stable section of the critical freezing point when the temperature of the meat food is cooled to the overcooled state to ensure that the meat food in the compartment is in a relatively low temperature environment for a long time and that the meat food is overcooled and fresh in the refrigerator without being frozen, thereby prolonging the fresh-preservation period.

It can be understood that, in this embodiment, at least two temperature detection devices are needed in the compartment, and the temperature detection device may be an ordinary temperature sensor, an infrared sensor, or any other device capable of detecting temperature. One temperature detection device is used to monitor the temperature of the placed meat, and the other temperature detection device is used to control the temperature of the compartment.

In addition, the control method provided by the embodiment of the present disclosure can also be applied to a liquid beverage, so that the liquid beverage can always maintain an overcooled state, that is, it is always in a cool and non-frozen state, thereby meeting the demand of some users for ice cold drinks.

According to the technical solution described above, the overcooled meat fresh-preservation control method provided by the embodiments of the present disclosure detects the temperature of the meat food placed in the compartment in real time, controls the compartment to perform a low-temperature operation to cool the meat food if the temperature of the meat food is greater than or equal to the first temperature threshold $t_0$ (for example, the meat food is normal temperature meat), meanwhile starts timing if the temperature of the meat food has been cooled down to the phase transformation point temperature $t_1$ during the process of cooling the meat food, and controls the compartment to perform a stable operation at a low-temperature critical freezing state with the freezing point temperature of the meat food as the target temperature after timing reaches a preset time length, so as to ensure that the meat food is at a relatively low temperature environment for a long time while ensuring that meat food is not frozen. It can be seen that the control method of the embodiments of the present disclosure mainly controls the meat food to be in an overcooled state for a long time and then maintains it near the freezing point, so as to ensure that the food is in a relatively low temperature environment for a long time and that the meat food is kept fresh in an overcooled state in the refrigerator without being frozen, thereby prolonging the fresh-preservation period. That is, the present embodiments utilize the characteristics of the overcooled and stable section of the meat food, fully exert the overcooled advantage, and make the meat in an overcooled state for a long time without being frozen, thereby prolonging the fresh-preservation period of the meat food. By adopting the control method of the embodiments of the present disclosure, the shelf life of the meat can be prolonged to more than 7 days, and the non-freezing and fresh-preservation effects can be achieved. Therefore, the control method provided by the embodiments of the present disclosure may prolong the fresh-preservation period as much as possible while ensuring that the meat food is not frozen.

Figure 2:
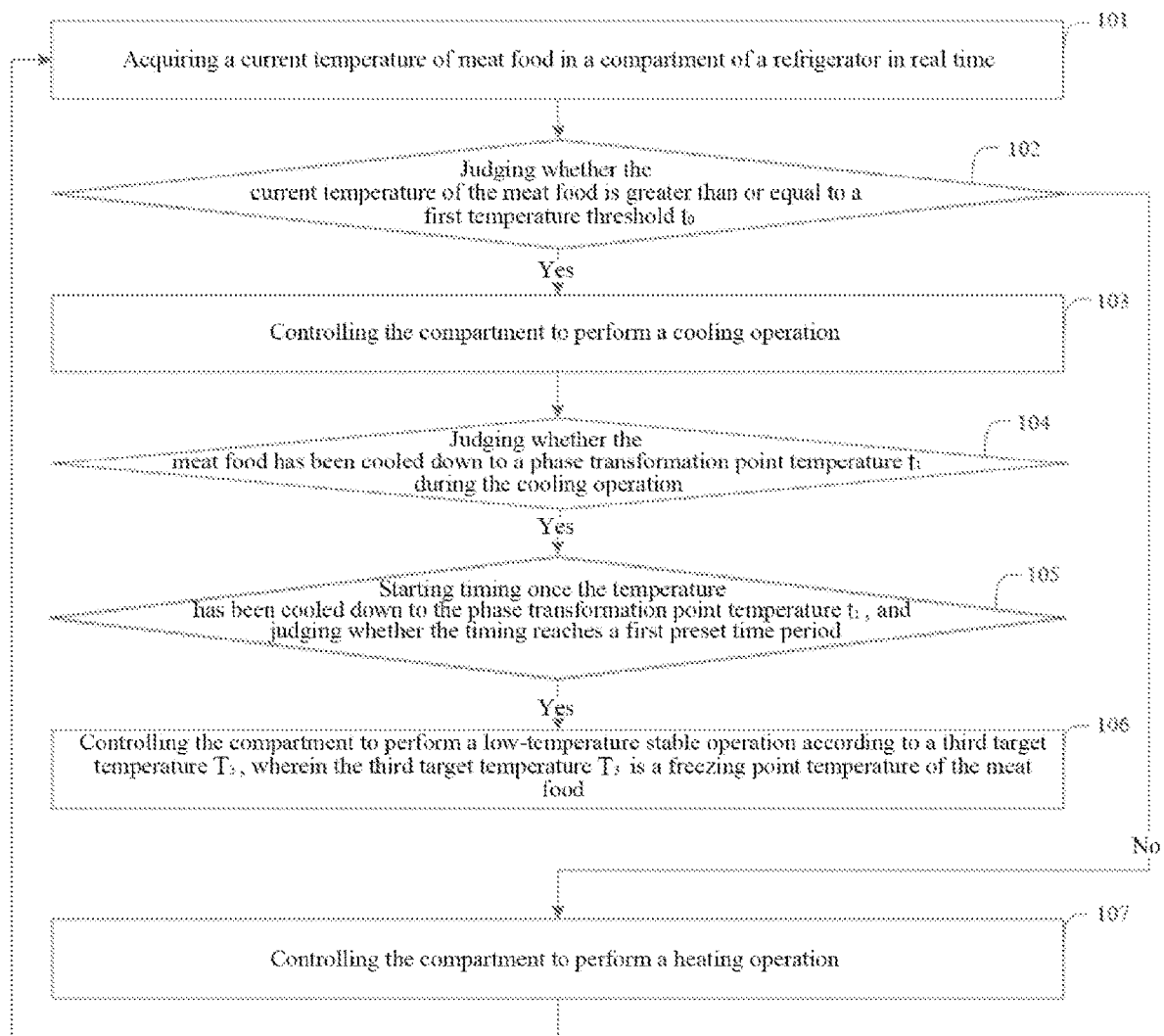
FIG. 2 is a flow chart of an overcooled meat fresh-preservation control method in a first alternative implementation according to an embodiment of the present disclosure.

In an alternative embodiment, referring to FIG. 2, if it is judged that the current temperature of the meat food is less than the first temperature threshold $t_0$ in the step 102, then step 107 is performed;

Step 107: the compartment is controlled to perform a heating operation;

wherein, after the performance of the step 107 is complete, the performance of the step 101 is continued.

It can be seen that in the alternative embodiment, the temperature of the meat food in the compartment is detected in real time, and the compartment is controlled to perform a low-temperature operation to cool the meat food if the temperature of the meat food is greater than or equal to the first temperature threshold $t_0$ (for example, the meat food is normal temperature meat); the compartment is controlled to perform high-temperature thawing so as to prevent the meat food from continuing freezing if the temperature of the meat food is lower than the first temperature threshold $t_0$ (for example, the meat food is frozen meat). When the meat food is subjected to high-temperature thawing, it is necessary to detect the temperature of the meat food in real time, and the compartment is re-controlled to perform the low-temperature operation to cool the meat food if the temperature of the meat food is again greater than or equal to the first temperature threshold $t_0$. Thus the embodiment continuously repeats the process of cooling and warming to ensure that the meat food is in a lower temperature environment for a long time without being frozen, so that the fresh-preservation period of the meat food is prolonged. When the compartment is controlled to perform the heating operation, the target temperature of the heating operation should not be excessively high, so as to prevent the warming temperature of the meat in the compartment from being too high, and it is preferable that the value range of the target temperature during the heating operation is −1 to 6° C., for example, 3° C.

Figure 3:
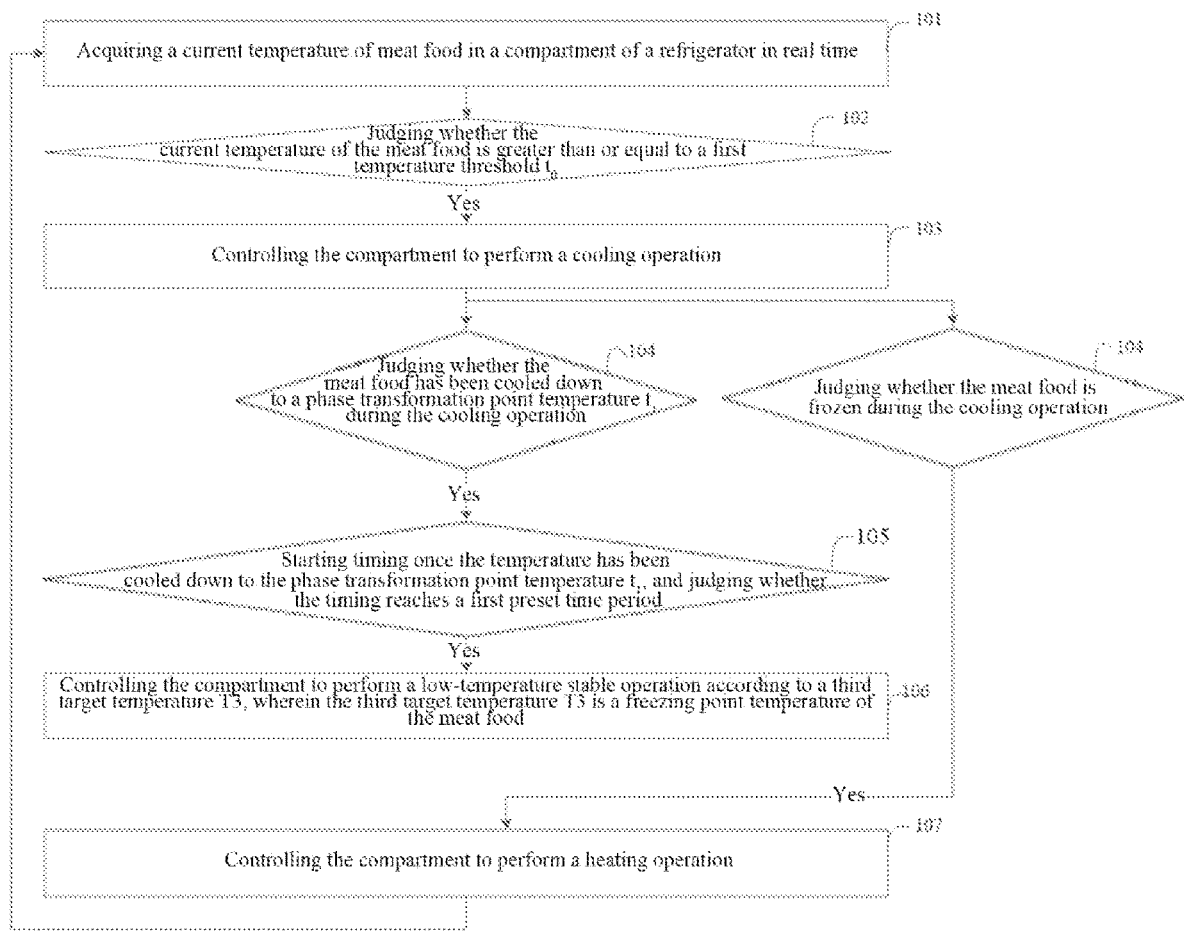
FIG. 3 is a flow chart of an overcooled meat fresh-preservation control method in a second alternative implementation according to an embodiment of the present disclosure.

In an alternative embodiment, referring to FIG. 3, the step 104 is further used to judge whether the meat food is frozen during the cooling operation; correspondingly, if it is judged that the meat food is frozen during the cooling operation in the step 104, then the step 107 is performed;

Step 107: the compartment is controlled to perform a heating operation;

wherein, after the performance of the step 107 is complete, the performance of the step 101 is continued.

In the present embodiment, it is preferable to add a determination here to prevent missed judgment of the abnormal freezing point and ensure the frozen meat is timely warmed and prevent freezing of the meat food, since the meat food may be frozen directly without passing through a phase transformation point during the cooling operation. That is, once the meat food is detected to be frozen, the warming treatment should be performed immediately on the meat food, and it is necessary to detect the temperature of the meat food in real time after the warming treatment is performed, and the compartment is re-controlled to perform the low-temperature operation to cool the meat food if the temperature of the meat food is again greater than or equal to the first temperature threshold $t_0$.

In an alternative embodiment, whether the meat food is frozen during the cooling operation can be judged in the step 104 by using any one or both of the following two judgment modes:

mode 1: judging whether the meat food has a lowest temperature point during the cooling operation, and judging that the meat food is frozen during the cooling operation if the lowest temperature point occurs and the temperature elevation amount in a preset continuous time period starting from the lowest temperature point is greater than or equal to a preset temperature change amount (the preset temperature change amount ranging from 1 to 2° C.); wherein the length of the preset continuous time period starting from the lowest temperature point is less than or equal to a first time length threshold. For example, the first time length threshold ranges from 5 to 10 minutes.

It should be understood that the lowest temperature point described herein refers to the lowest temperature point before the temperature of the meat food is elevated during the freezing operation. Because the temperature of the meat food suddenly has a slightly higher temperature during the freezing operation and then continues to drop, the temperature point ahead of the point of this slightly higher temperature is the lowest point described here, which can also be understood as a pole.

Mode 2: judging whether a case that the temperature of the meat food remains unchanged during a preset continuous time period occurs during the cooling operation, and if yes, judging that the meat food is frozen during the cooling operation, wherein the length of the preset continuous time period is greater than or equal to a second time length threshold. For example, the second time length threshold ranges from 0.5 to 2 hours.

It can be understood that the two modes above are used to actually judge the freezing nodes in the two cases that the meat is in an overcooled state and in a non-overcooled state during the cooling operation.

It can be further understood that the cooling termination point in this embodiment is the phase transformation sudden-rise point of the temperature (the mode 1 above) or the phase transformation stable section (the mode 2 above), and the warming treatment should be performed immediately if it is judged that the freezing occurs.

Figure 4:
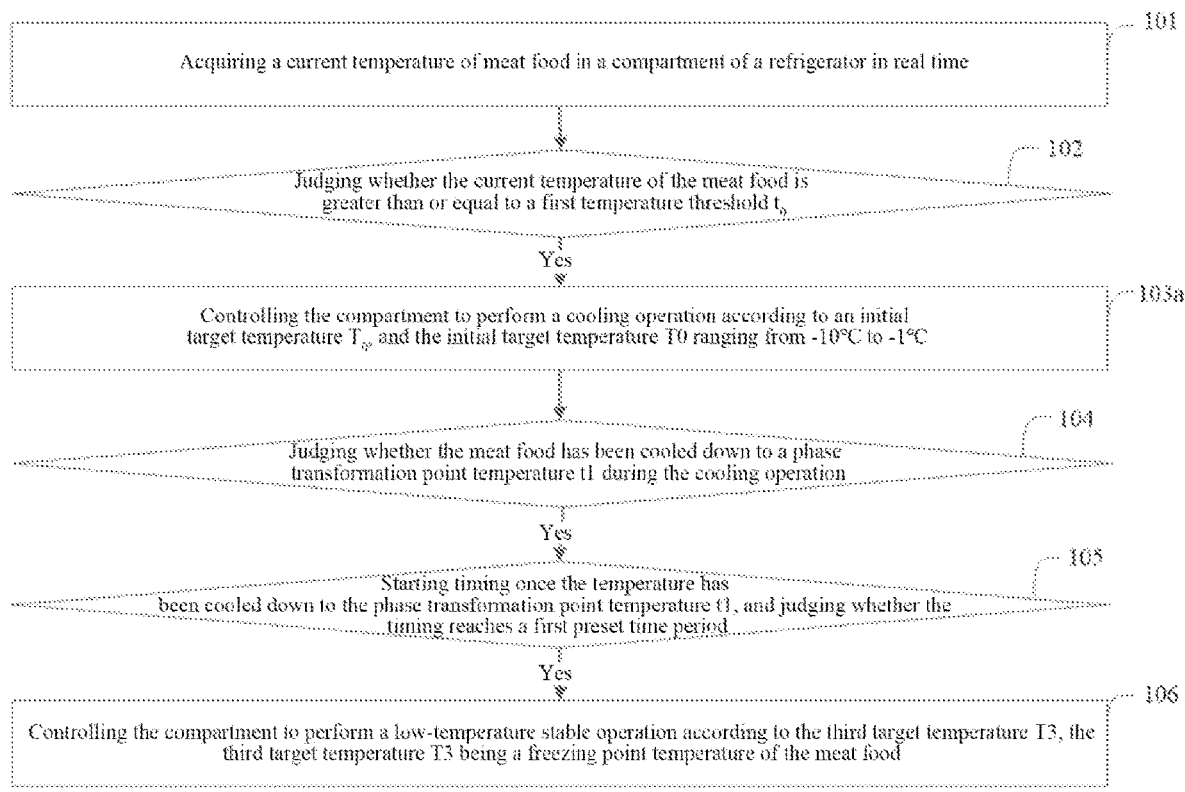
FIG. 4 is a flow chart of an overcooled meat fresh-preservation control method a third alternative implementation according to an embodiment of the present disclosure.

In an alternative embodiment, referring to FIG. 4, the step 103 specifically includes:

step 103a: controlling the compartment to perform a cooling operation according to an initial target temperature $T_0$, and the initial target temperature $T_0$ ranging from $-10°$ C. to $-1°$ C.

In the present embodiment, the compartment is controlled to perform a cooling operation according to the initial target temperature $T_0$ to ensure that the meat food in the compartment is quickly cooled to a frozen state to keeping the fresh component as much as possible.

Figure 5:
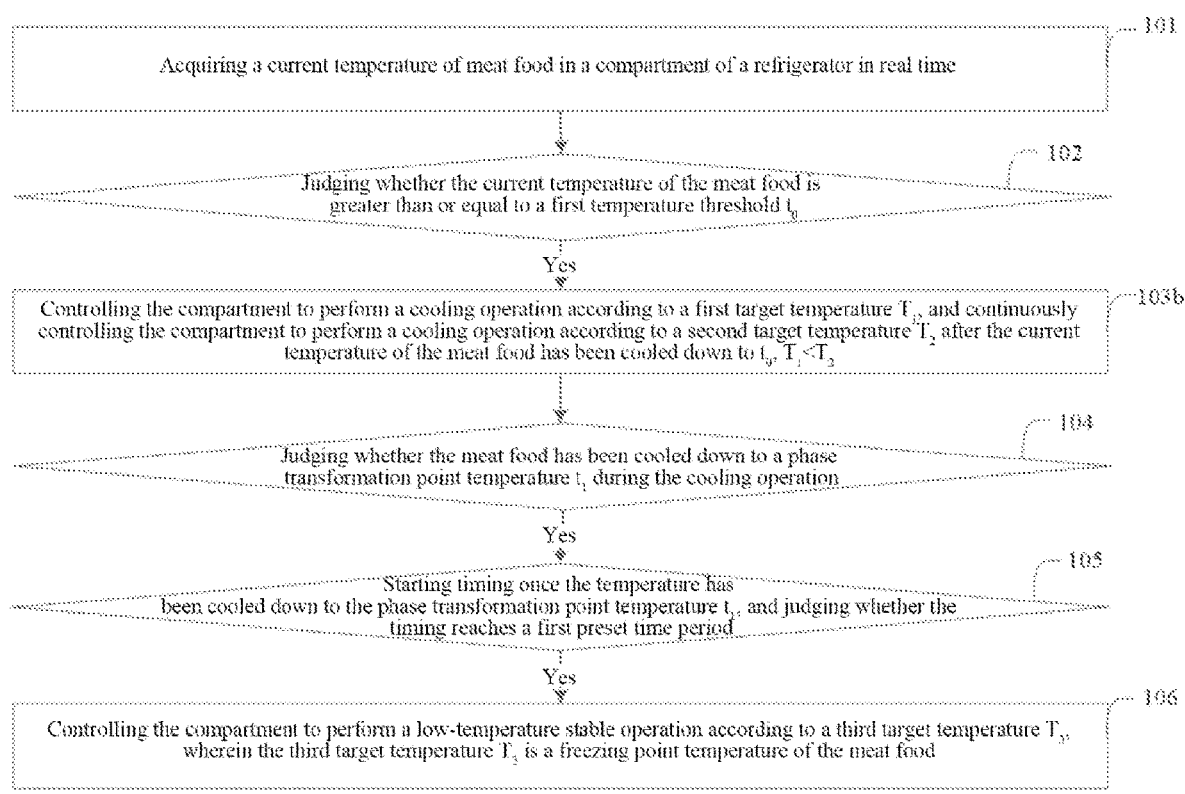
FIG. 5 is a flow chart of an overcooled meat fresh-preservation control method in a fourth alternative implementation according to an embodiment of the present disclosure.

In another alternative embodiment, different from the alternative embodiments above, referring to FIG. 5, the step 103 specifically includes:

step 103b: controlling the compartment to perform a cooling operation according to a first target temperature $T_1$, and continuously controlling the compartment to perform a cooling operation according to the second target temperature $T_2$ after the current temperature of the meat food has been cooled down to $t_0$, $T_1 < T_2$.

Unlike the alternative embodiment above, in the present embodiment, the cooling operation is divided into two stages, and the target temperature setting value is controlled so that earlier stage of the cooling operation operates at a lower temperature and the cooling amount is larger, the meat food is quickly brought to the $t_0$ level, and then the set temperature is elevated, so that the meat food slowly enters the overcooled or freezing process, thereby effectively prolonging the storage time at low temperatures.

Figure 6:
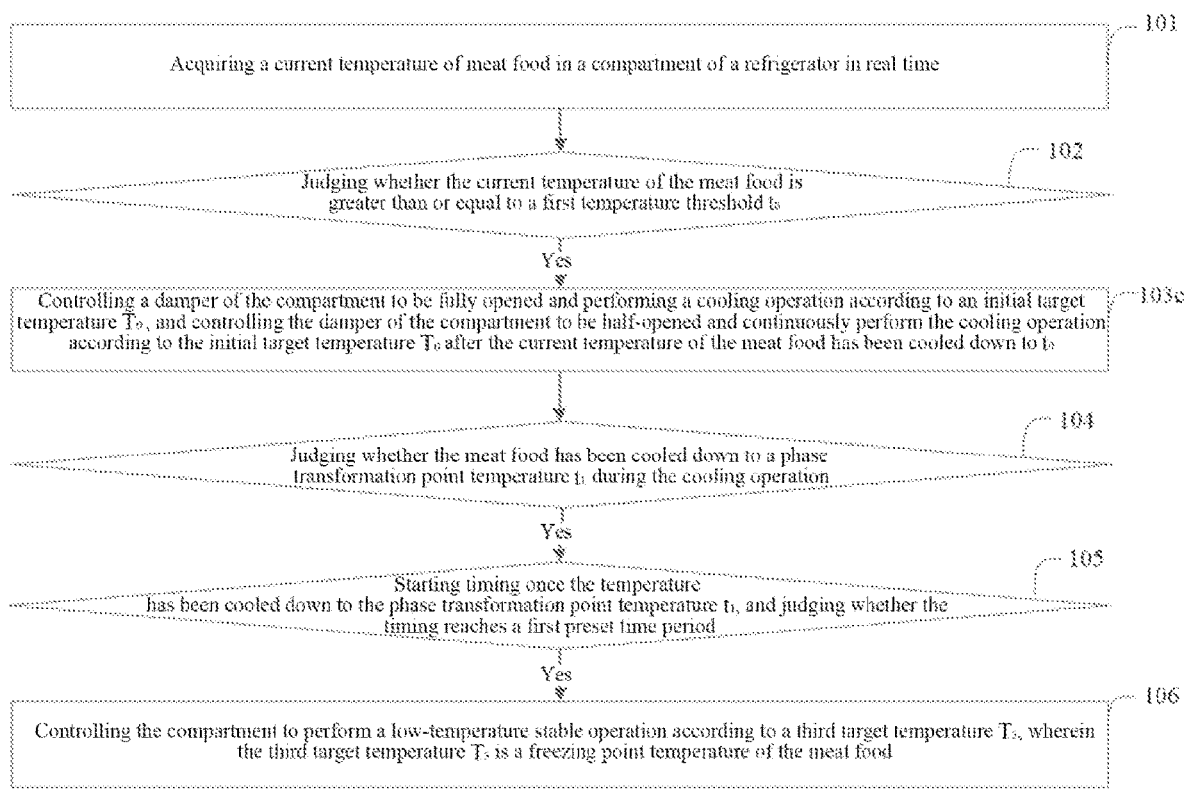
FIG. 6 is a flow chart of an overcooled meat fresh-preservation control method in a fifth alternative implementation according to an embodiment of the present disclosure.

In still another alternative embodiment, unlike two alternative embodiments above, referring to FIG. 6, the step 103 specifically includes:

step 103c: controlling a damper of the compartment to be fully opened and performing a cooling operation according to the initial target temperature $T_0$, and controlling the damper of the compartment to be half-opened and continuously perform a cooling operation according to the initial target temperature $T_0$ after the current temperature of the meat food has been cooled down to $t_0$.

Unlike the two alternative embodiment above, in the present embodiment, the cooling operation is divided into two stages, and the damper of the compartment is controlled to be fully opened and half-opened so that the cooling amount at the earlier stage of the cooling operation is larger, the meat food is quickly brought to the to level, and then the damper is controlled to be half-opened, so that the cooling amount is decreased, the meat food slowly enters the overcooled or freezing process, thereby effectively prolonging the storage time at low temperatures.

The two cooling modes shown in FIGS. 5 and 6 include two cooling stages, of which one is a rapid cooling stage and the other is a slow cooling stage, and the final purpose is to achieve an overcooled state.

Figure 7:
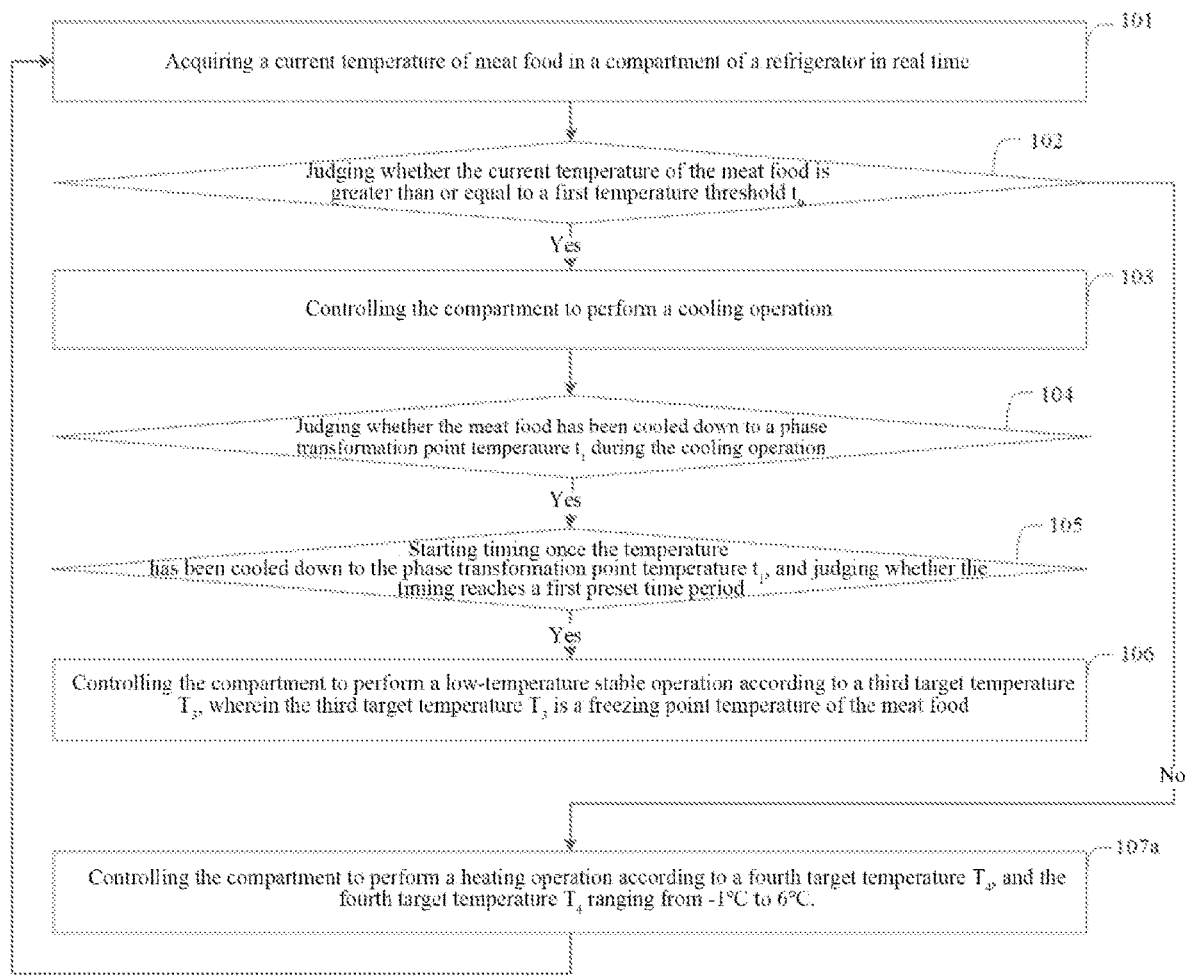
FIG. 7 is a flow chart of an overcooled meat fresh-preservation control method in a sixth alternative implementation according to an embodiment of the present disclosure.

In an alternative embodiment, referring to FIG. 7, the step 107 specifically includes:

step 107a: controlling the compartment to perform a heating operation according to a fourth target temperature $T_4$, and the fourth target temperature $T_4$ ranging from $-1°$ C. to $6°$ C.

In the present embodiment, the compartment is controlled to perform a heating operation according to the third target temperature $T_3$ to ensure that the meat food in the compartment is not excessively warmed.

Figure 8:
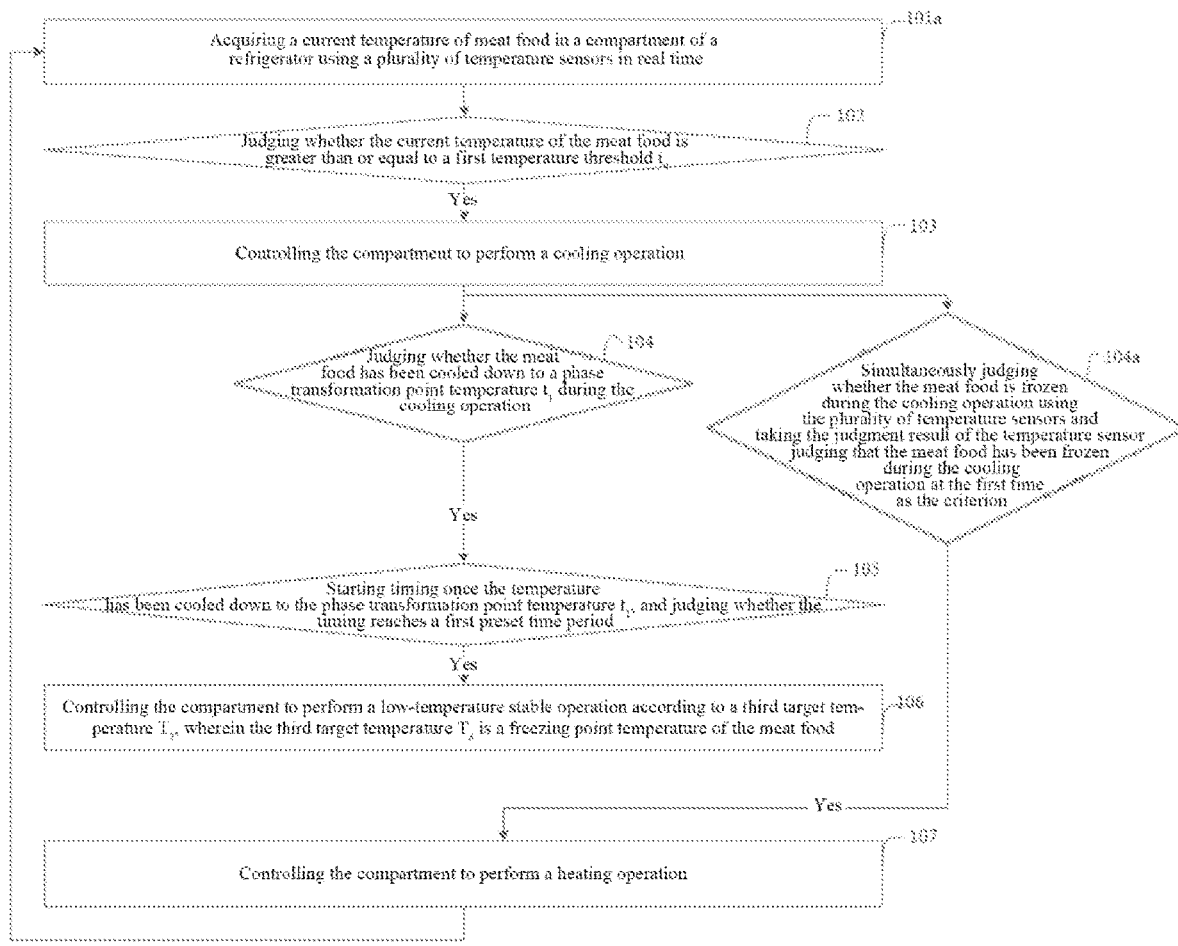
FIG. 8 is a flow chart of an overcooled meat fresh-preservation control method in a seventh alternative implementation according to an embodiment of the present disclosure.

In an alternative embodiment, referring to FIG. 8, the step 101 specifically includes:

step 101a: acquiring a current temperature of meat food in a compartment of the refrigerator using a plurality of temperature sensors in real time;

correspondingly, the judging whether the meat food is frozen during the cooling operation in the step 104 specifically includes:

step 104a: simultaneously judging whether the meat food is frozen during the cooling operation using the plurality of temperature sensors and taking the judgment result of the temperature sensor judging that the meat food has been frozen during the cooling operation at the first time as the criterion.

In the alternative embodiment, a plurality of temperature sensors are used to judge whether the meat food is frozen during the cooling operation to ensure that the freezing phenomenon of the meat food can be accurately and timely discovered. When a certain temperature sensor judges that the meat food is frozen during the cooling operation at the first time, and the subsequent warming process is performed immediately to ensure that the meat food does not be frozen by taking the judgment result of this temperature sensor as a criterion.

In addition, during the entire control process, the plurality of temperature sensors can always compare the temperatures. If temperatures detected by more than two temperature sensors are below a certain value (for example, $-10°$ C.), it means that there is a large amount of frozen meat placed into the compartment, and it is necessary to forcibly perform the step 107 to control the warming at this time.

Figure 9:
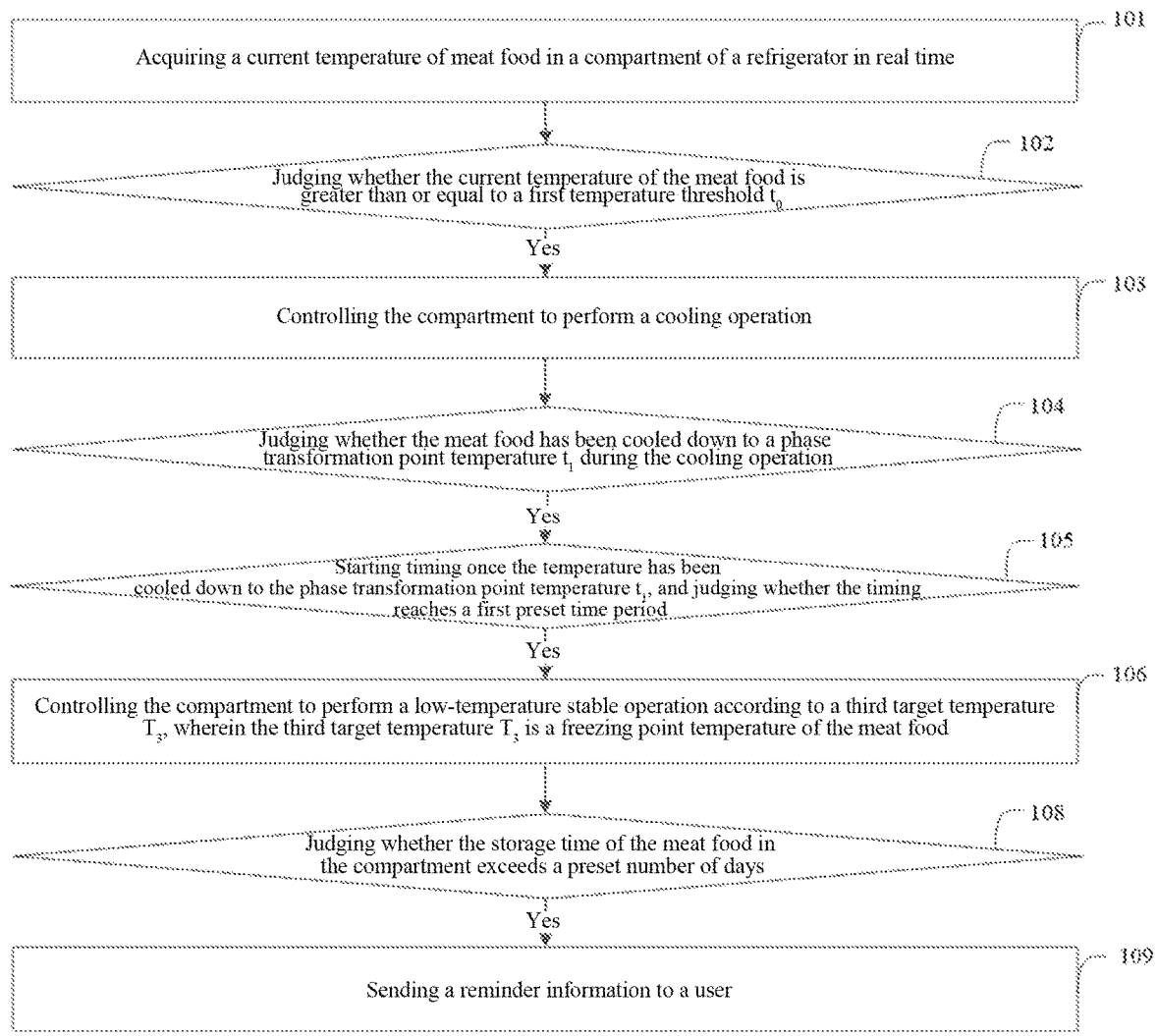
FIG. 9 is a flow chart of an overcooled meat fresh-preservation control method in an eighth alternative implementation according to an embodiment of the present disclosure.

In an alternative embodiment, referring to FIG. 9, the method also includes step 108 and step 109.

Step 108: whether the storage time of the meat food in the compartment exceeds a preset number of days is judged, and if yes, then the step 109 is performed.

Step 109: a reminder information is sent to a user.

In this alternative embodiment, the user is reminded to take out the food in time for eating by sending the reminder information to the user after the storage time of the meat food in the compartment is judged. For example, when the user opens the compartment, there is a reminder signal such as an indicator light or blinking, or corresponding reminder information is directly displayed on the display screen. In addition, the reminder function can also be implemented through the mobile phone software, for example, the reminder information is pushed to the mobile phone software, and the user is informed of the reminder information through the mobile phone software.

It can be understood that the foregoing various alternative embodiments may be combined in any manner and the present disclosure does not limit this.

Figure 10:
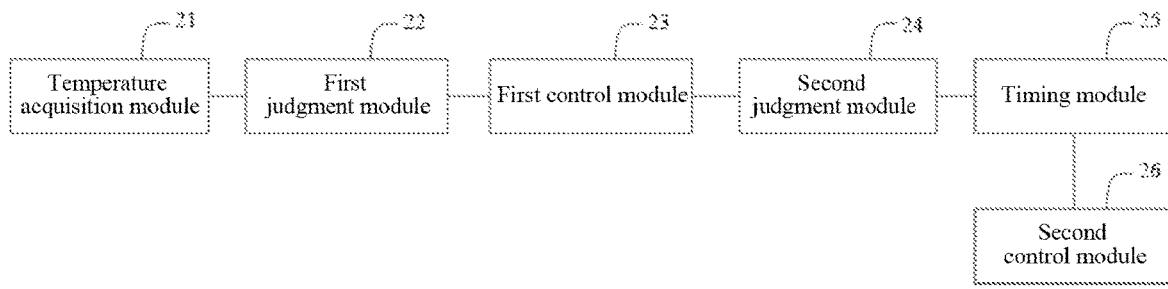
FIG. 10 is a schematic structural diagram of a controller according to another embodiment of the present disclosure.

Based on the same inventive concept, another embodiment of the present disclosure provides a controller. Referring to FIG. 10, the controller includes: a temperature acquisition module 21, a first judgment module 22, a first control module 23, and a second judgment module 24, a timing module 25 and a second control module 26, wherein:

the temperature acquisition module 21 is configured to acquire a current temperature of meat food in a compartment of a refrigerator in real time;

the first judgment module 22 is configured to judge whether the current temperature of the meat food is greater than or equal to a first temperature threshold $t_0$;

the first control module 23 is configured to control the compartment to perform a cooling operation when the first judgment module judges that the current temperature of the meat food is greater than or equal to the first temperature threshold $t_0$;

the second judgment module 24 is configured to judge whether the meat food has been cooled down to a phase transformation point temperature $t_1$ during the cooling operation, wherein the phase transformation point temperature $t_1$ is the temperature of a critical point at which the phase transformation of the meat food occurs;

the timing module 25 is configured to start timing once the temperature has been cooled down to the phase transformation point temperature $t_1$; and the second control module 26 is configured to control the compartment to perform a low-temperature stable operation according to a third target temperature $T_3$ after the timing by the timing module reaches the first preset time period, wherein the third target temperature $T_3$ is a freezing point temperature of the meat food.

Figure 11:
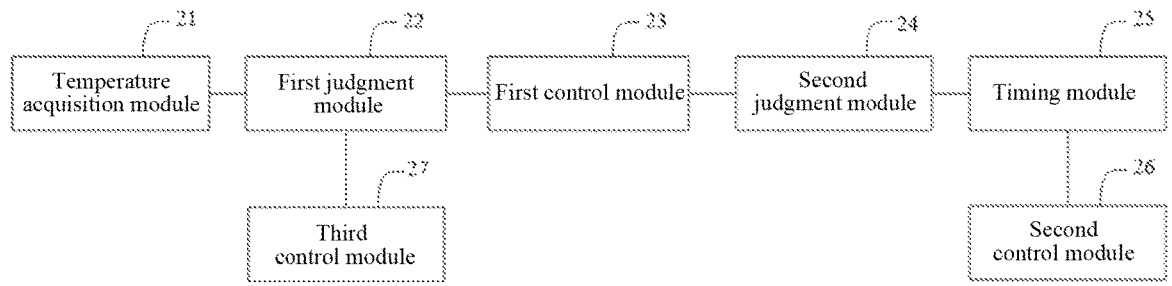
FIG. 11 is another schematic structural diagram of a controller according to another embodiment of the present disclosure.

In an alternative embodiment, referring to FIG. 11, the controller further includes:

a third control module 27 configured to control the compartment to perform a heating operation when the first judgment module 22 judges that the current temperature of the meat food is less than the first temperature threshold $t_0$.

In an alternative embodiment, the second judgment module is further configured to judge whether the meat food is frozen during the cooling operation.

Correspondingly, the controller further includes:

a third control module configured to control the compartment to perform a heating operation when the second judgment module judges that that the meat is frozen during the cooling operation.

In an alternative embodiment, when the second judgment module judges whether the meat food is frozen during the cooling operation, it is specifically configured to:

judge whether the meat food has a lowest temperature point during the cooling operation, and judge that the meat food is frozen during the cooling operation if the lowest temperature point occurs and the temperature elevation amount in a preset continuous time period starting from the lowest temperature point is greater than or equal to a preset temperature change amount; wherein the length of the preset continuous time period starting from the lowest temperature point is less than or equal to a first time length threshold;

and/or, judge whether a case that the temperature of the meat food remains unchanged during a preset continuous time period occurs during the cooling operation, and if yes, judge that the meat food is frozen during the cooling operation, wherein the length of the preset continuous time period is greater than or equal to a second time length threshold.

In an alternative embodiment, when the first control module controls the compartment to perform a cooling operation, it is specifically configured to:

control the compartment to perform a cooling operation according to an initial target temperature $T_0$, and the initial target temperature $T_0$ ranges from $-10°$ C. to $-1$.

In an alternative embodiment, when the first control module controls the compartment to perform a cooling operation, it is specifically configured to:

control the compartment to perform a cooling operation according to a first target temperature $T_1$, and continuously control the compartment to perform a cooling operation according to a second target temperature $T_2$ after the current temperature of the meat food has been cooled down to $t_0$, $T_1<T_2$.

In an alternative embodiment, when the first control module controls the compartment to perform a cooling operation, it is specifically configured to:

control a damper of the compartment to be fully opened and performing a cooling operation according to the initial target temperature $T_0$, and control the damper of the compartment to be half-opened and continuously perform a cooling operation according to the initial target temperature $T_0$ after the current temperature of the meat food has been cooled down to $t_0$.

In an alternative embodiment, when the third control module controls the compartment to perform a heating operation, it is specifically configured to:

control the compartment to perform a heating operation according to a fourth target temperature $T_4$, and the fourth target temperature $T_4$ ranges from $-1°$ C. to $6°$ C.

In an alternative embodiment, the temperature acquisition module is specifically configured to acquire the current temperature of the meat food in the compartment of the refrigerator using a plurality of temperature sensors;

correspondingly, when the second judgment module judges whether the meat food is frozen during the cooling operation, it is specifically configured to:

simultaneously judge whether the meat food is frozen during the cooling operation using the plurality of temperature sensors and take the judgment result of the temperature sensor judging that the meat food has been frozen during the cooling operation at the first time as the criterion.

In an alternative embodiment, the first temperature threshold $t_0$ ranges from $-2°$ C. to $4°$ C.

In an alternative embodiment, the compartment is one or more of the following:

a variable temperature chamber of a refrigerator or a variable temperature region isolated by the variable temperature chamber, a variable temperature drawer in a refrigerating compartment of the refrigerator or a variable temperature region isolated by the variable temperature drawer, and a variable temperature drawer in a freezing compartment of the refrigerator or a variable temperature region isolated by the variable temperature drawer.

Figure 12:
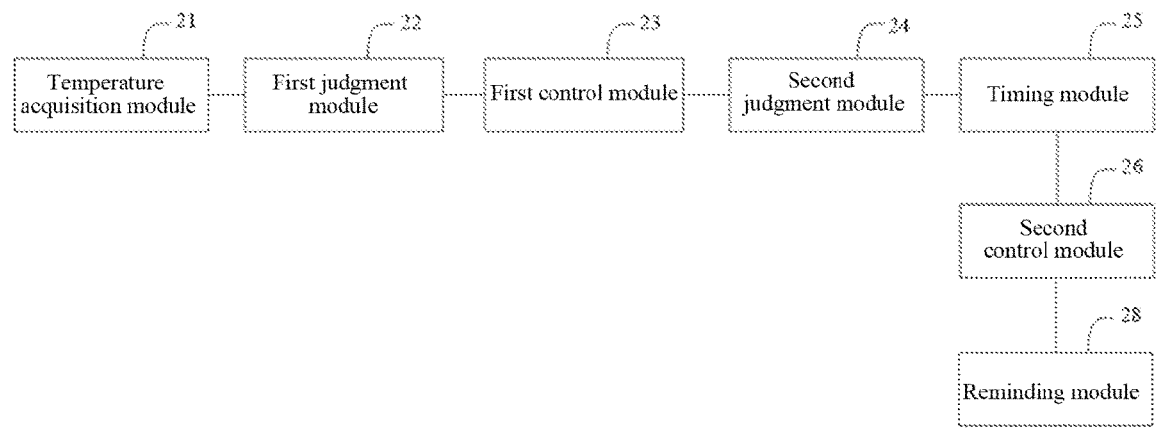
FIG. 12 is still another schematic structural diagram of a controller according to another embodiment of the present disclosure.

In an alternative embodiment, referring to FIG. 12, the controller further includes:

a reminding module 28 configured to send a reminder information to a user if it is judged that the storage time of the meat food in the compartment of the refrigerator exceeds the preset number of days.

The controller of the embodiments of the present disclosure can be used to perform the overcooled meat fresh-preservation control method described in the above embodiments, and the principle and technical effects thereof are similar and will not be described in detail herein.

Figure 13:
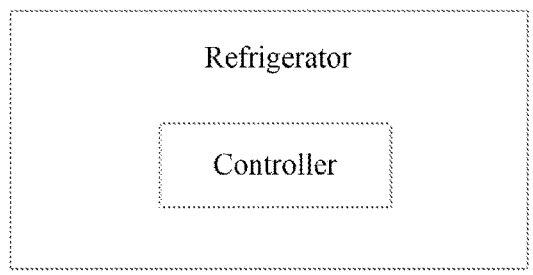
FIG. 13 is a schematic structural diagram of a refrigerator according to still another embodiment of the present disclosure.

Based on the same inventive concept, still another embodiment of the present disclosure provides a refrigerator, referring to FIG. 13, which includes the controller as described in the embodiments above.

Since the refrigerator provided by the embodiments of the disclosure includes the controller of the embodiments above, the refrigerator provided by the embodiments of the disclosure can realize the overcooled fresh-preservation of the meat, and the fresh-preservation period is prolonged while ensuring that the meat is not frozen, thereby improving the user experience and meeting user needs.

The embodiments above are only used to explain the technical solutions of the present disclosure, and are not limited thereto; although the present disclosure is described in detail with reference to the foregoing embodiments, it should be understood by those skilled in the art that they can still modify the technical solutions described in the foregoing embodiments and make equivalent replacements to a part of the technical features; and these modifications and substitutions do not make the essence of the corresponding technical solutions depart from the spirit and scope of the technical solutions of the embodiments of the present disclosure.

The invention claimed is:

1. A controller, comprising:
a temperature acquisition module configured to acquire a first temperature of a piece of meat in a compartment of a refrigerator from a plurality of sensors;
a first judgment module configured to determine whether the first temperature of the piece of meat is greater than or equal to a first temperature threshold;
a first control module configured to control a cooling operation on the compartment when the first judgment module determines that the first temperature of the piece of meat is greater than or equal to the first temperature threshold;
a second judgment module configured to determine whether the piece of meat has been cooled down to a second threshold temperature during the cooling operation based on a second temperature of the piece of meat acquired by the temperature acquisition module;
a timing module configured to start a timing operation once the piece of meat has been cooled down to the second threshold temperature; and
a second control module configured to control a low-temperature stable operation on the compartment according to a third target temperature after the timing operation by the timing module has lapsed for a first preset time period.

2. The controller of claim 1, further comprising:
a third control module configured to control a heating operation on the compartment when the first judgment module determines that the first temperature of the piece of meat is less than the first temperature threshold.

3. The controller of claim 1, wherein the second judgment module is further configured to determine whether the piece of meat is frozen during the cooling operation; and
the controller further comprises:
a third control module configured to control a heating operation on the compartment when the second judgment module determines that that the piece of meat is frozen during the cooling operation.

4. The controller of claim 3, wherein when the second judgment module determines whether the piece of meat is frozen during the cooling operation, it is configured to:
determine that the piece of meat is frozen during the cooling operation if the piece of meat has a valley temperature point during the cooling operation and a temperature elevation amount in a first preset continuous time period starting from the valley temperature point is greater than or equal to a preset temperature change amount; and,
determine that the meat food is frozen during the cooling operation if a temperature of the piece of meat remains unchanged during a second preset continuous time period in the cooling operation.

5. The controller of claim 1, wherein when the first control module controls the cooling operation on the compartment, it is configured to:
control the cooling operation on the compartment to perform a cooling operation according to an initial target temperature, the initial target temperature being in a range from about −10° C. to about −1° C.

6. The controller of claim 1, wherein when the first control module controls the cooling operation on the compartment, it is configured to:
control the cooling operation on the compartment according to a first target temperature, and continuously control the cooling operation according to a second target temperature after a temperature of the piece of meat food has been cooled down to the first temperature threshold, the first target temperature being smaller than the second target temperature.

7. The controller of claim 1, wherein when the first control module controls the cooling operation on the compartment, it is configured to:
control a damper of the compartment to be fully opened and perform a cooling operation according to an initial target temperature, and control the damper of the compartment to be half-opened and continuously perform the cooling operation according to the initial target temperature after a temperature of the piece of meat has been cooled down to the first temperature threshold.

8. The controller of claim 2, wherein when the third control module controls the heating operation on the compartment, it is configured to:
control the heating operation on the compartment according to a fourth target temperature, the fourth target temperature being in a range from about −1° C. to about −6° C.

9. The controller of claim 3, wherein the temperature acquisition module is configured to acquire the first temperature of the piece of meat in the compartment of the refrigerator using a plurality of temperature sensors; and
when the second judgment module determines whether the piece of meat is frozen during the cooling operation, it is configured to:
determine whether the piece of meat food is frozen during the cooling operation using the plurality of temperature sensors and based on a measurement result of a temperature sensor of the plurality of temperature sensors indicating that the meat food has been frozen during the cooling operation.

10. The controller of claim 1, wherein the first temperature threshold ranges from −2 to 4° C.

11. The controller of claim 1, wherein the compartment is one or more of:
- a variable temperature chamber of a refrigerator or a variable temperature region isolated by the variable temperature chamber,
- a variable temperature drawer in a refrigerating compartment of the refrigerator or a variable temperature region isolated by the variable temperature drawer, or
- a variable temperature drawer in a freezing compartment of the refrigerator or a variable temperature region isolated by the variable temperature drawer.

12. The controller of claim 1, further comprising:
- a reminding module configured to send a reminder information to a user if it is determined that a storage time of the piece of meat in the compartment of the refrigerator exceeds a preset number of days.

* * * * *